March 26, 1963     E. C. HERBKERSMAN     3,083,024
ROLL-OVER CHUCK

Filed Sept. 11, 1961                    4 Sheets-Sheet 1

INVENTOR.
EARLE C. HERBKERSMAN
BY
John H. Leonard
his ATTORNEY.

INVENTOR.
EARLE C. HERBKERSMAN
BY
ATTORNEY.

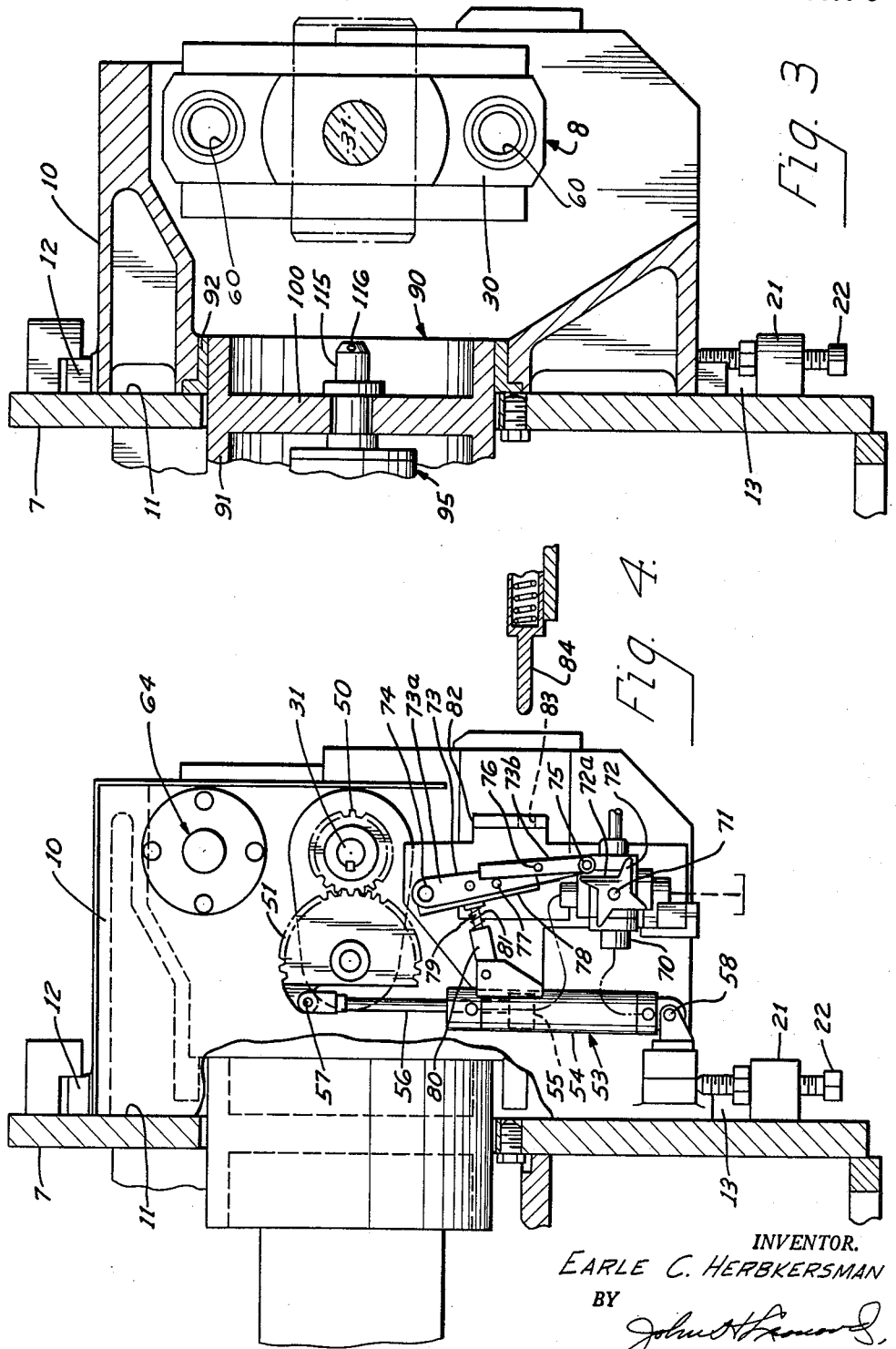

March 26, 1963   E. C. HERBKERSMAN   3,083,024
ROLL-OVER CHUCK
Filed Sept. 11, 1961   4 Sheets-Sheet 4

INVENTOR.
EARLE C. HERBKERSMAN
BY
*his* ATTORNEY.

Patented Mar. 26, 1963

3,083,024
ROLL-OVER CHUCK
Earle C. Herbkersman, Parma, Ohio, assignor to The Pipe Machinery Company, Wickliffe, Ohio, a corporation of Ohio
Filed Sept. 11, 1961, Ser. No. 137,084
13 Claims. (Cl. 279—5)

This invention relates to a chuck, and particularly to a chuck which is adapted to grip a workpiece and present one end to a machine for machining, then roll over 180° and present the opposite end to the machine for machining.

For the purposes of illustration, the invention is described as applied to a roll-over chuck for holding cylindrical pipe coupling sleeves for performing machining and threading operations thereon first at one end and then at the opposite end, its use in connection with other workpieces being readily apparent from the illustrative example.

In the machining of pipe couplings for deep well pipe, the couplings must be precisely formed with very slight tolerances in dimensions, shapes, and clearances and with precision in axial alignment of the threads cut from opposite ends of the sleeve toward its longitudinal midportion. Heretofore, sleeves of this nature have been machined, threaded, and chamfered, and the like by chucking the sleeve for presenting one end for these operations from the one end thereof, then removing the sleeve and rechucking for presenting the opposite end for like operations from the opposite end.

In accordance with the present invention, the workpiece is gripped in a chuck which is arranged with a forward and rearward face, each of which is adapted to be presented toward a machine in position for machining the workpiece held by the chuck. Generally, the spindle machine which is to operate on the workpiece is one having a horizontal axis, and in the illustrative example, the chuck is shown having an operating position in which its throat axis is horizontal and coincident with that of the rotating spindle of the machine, regardless of which face is presented toward the machine.

The chuck is generally carried on a suitable carriage which is arranged for limited floating movement in a plane normal to the axis of the spindle or of the chuck throat when the chuck is in its proper operating position. Cooperable positioning means are provided on the machine carriage and on the chuck carriage for interengagement and positioning the chuck carriage in proper relation to the machine tool when the machine advances.

In addition, the chuck is mounted so that it can be rotated about a transverse axis intersecting its throat axis at a right angle and lying between the chuck faces, and thereby present either face toward the machine with the throat axis coincident with the axis of the spindle of the machine. Latching means are provided to lock the chuck securely in the rotated position in which it is to operate. Preload backup means are provided for engaging the chuck at the face opposite from that facing the machine and preloading and reinforcing it to prevent the rotation of the chuck about its transverse axis out of its proper plane in which its throat axis is coincident with that of the spindle axis, and also to prevent deflection of the chuck in any manner by the force of the advancing tool.

Further, the chuck is arranged so that it can be operated effectively in sequence and preset by the advance of the machine so that when power is subsequently admitted to its roll-over driving mechanism, that mechanism will roll the chuck over into the proper preselected position.

For the purposes of illustration, the chuck is shown as mounted on a suitable primary support which may be the rotatable turret of a machine such as more fully described in my copending application, Serial No. 133,718, filed August 24, 1961, and entitled "Multi-Station Machine Including Work Holding and Positioning Apparatus."

If desired, of course, the chuck can be mounted on a stationary support for use in connection with one spindle machine or at a fixed station, as will be apparent from the illustrative example.

Various objects and advantages will become apparent from the following description wherein reference is made to the drawings, in which:

FIG. 3 is a vertical sectional view of the chuck and is taken on the line 3—3 of FIG. 1;

FIG. 4 is a side elevation of the chuck and a portion of the supporting turret and the preload mechanism thereon, part thereof being shown in section for clearness in illustration;

FIG. 5 is a fragmentary vertical sectional view taken on the line 5—5 in FIG. 1.

Figure 1:
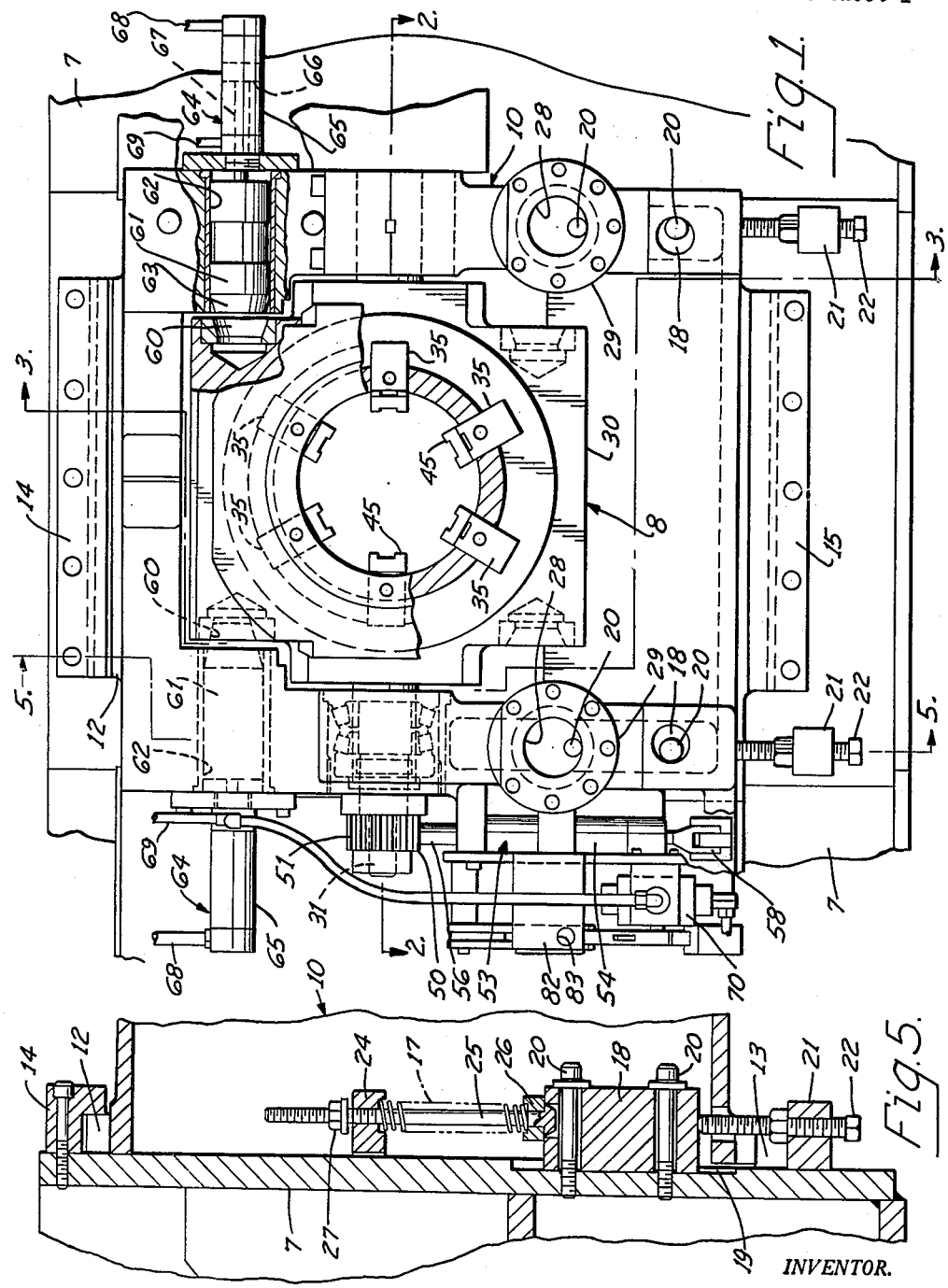
FIG. 1 is a front elevation of the chuck and its supporting and operating mechanism, mounted on a turret, a fragment only of which is shown, part of the operating mechanism being shown in section for clearness in illustration.
Figure 2:
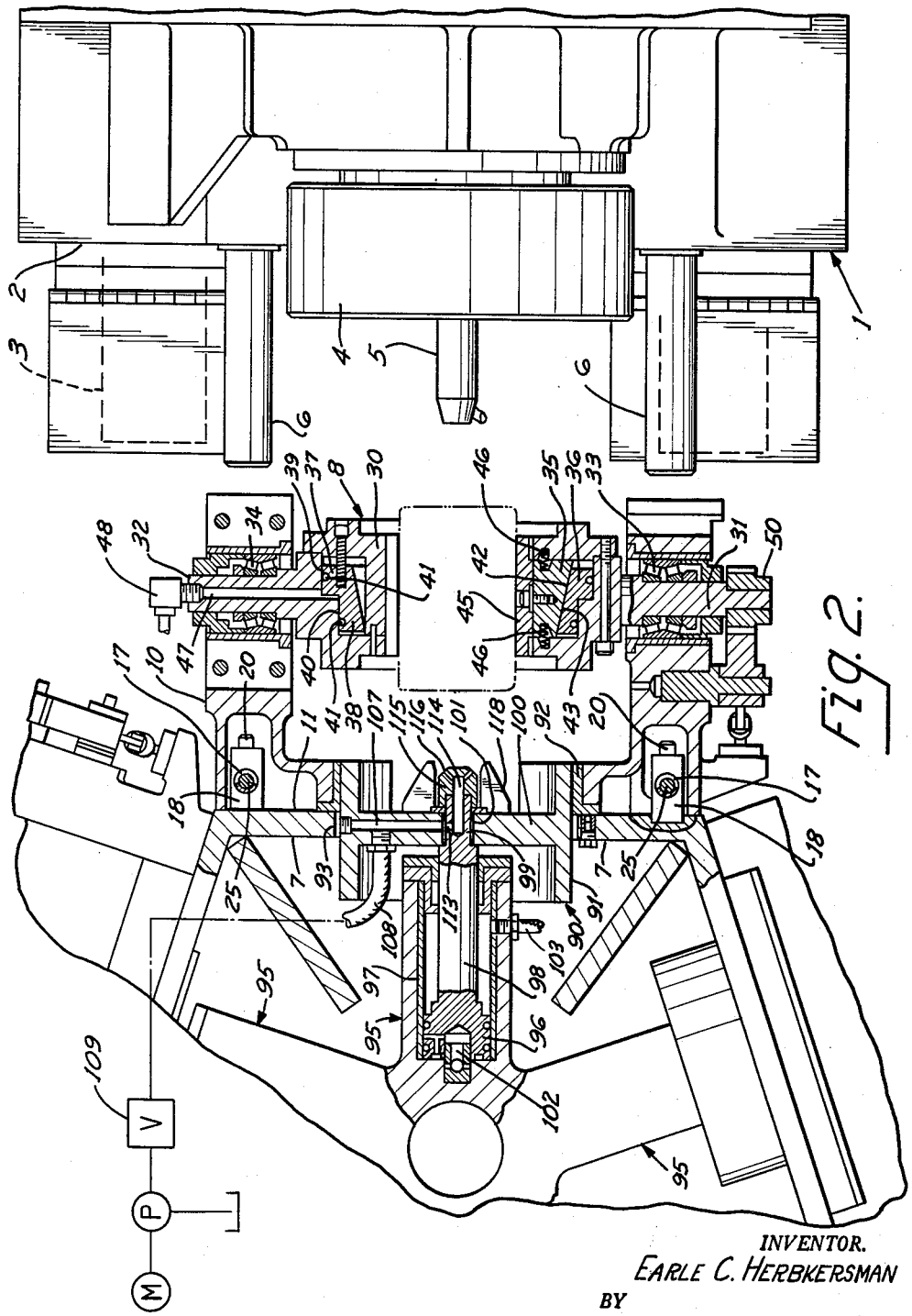
FIG. 2 is a horizontal sectional view taken on the line 2—2 of FIG. 1.
Figure 6:
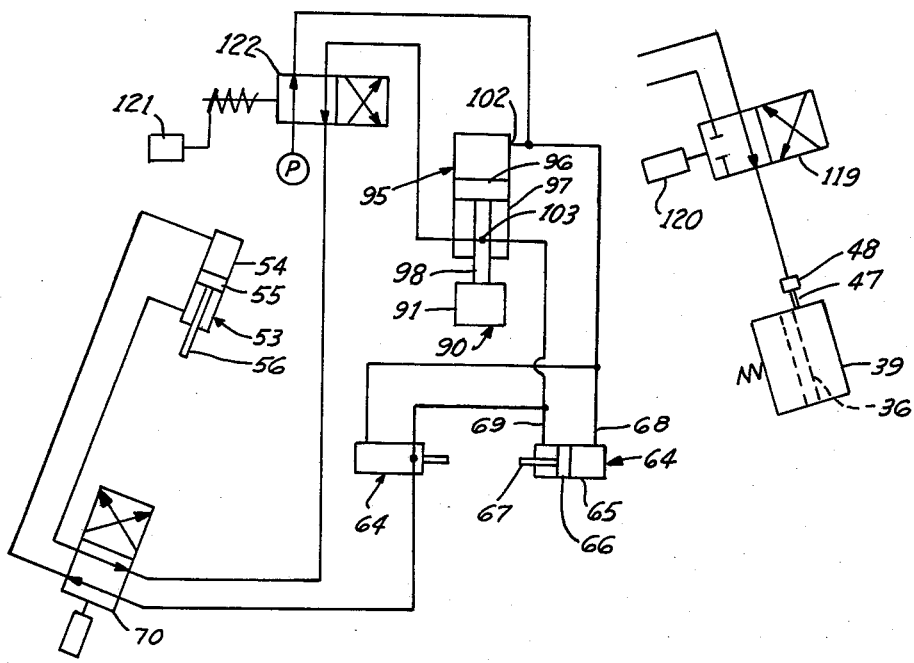
FIG. 6 is a diagram showing the fluid pressure and control circuit for the roll over mechanism of the chuck.

Referring to the drawings, the chuck is shown as arranged for cooperation with a rotary spindle machine, indicated generally at 1, and having a carriage 2 which is mounted on suitable slideways 3 for sliding parallel to the throat axis of the chuck when the chuck is in operating position. The carriage 2 carries a machine spindle 4 on which is supported a suitable tool 5 for cooperation with the workpiece held in the chuck. The spindle axis is horizontal and coincident with the throat axis. The spindle carriage 2 is provided with positioning pins 6 for positioning the chuck with its throat axis coincident with the spindle axis, as is later described.

The chuck is shown as mounted on a suitable support 7 which, in the form illustrated, may be a portion of the turret described in the identified application and which is rotatable about an upright axis.

A chuck 8 embodying the principles of the present invention is supported on the support 7 so that the axis of the chuck throat is horizontal for cooperation with the machine 1 when the chuck is in operating position.

The chuck 8 is carried on a carriage 10 which, in turn, is juxtaposed against an upright face 11 of the turret. The face 11 is disposed in a plane normal to the axis of the machine spindle. In order to support the carriage 10 for limited universal floating movement parallel to, and along, the face 11 of the support 8, the carriage 10 is provided at its upper end with a slide 12 and at its lower end with a slide 13. The slides are held and guided by suitable guides 14 and 15, respectively, which are secured to the turret by bolts or otherwise. The guides 14 and 15 hold the carriage in proper position against the face 11 of the turret with slight operating clearance.

In order to reduce inertial and frictional stresses occasioned by the floating movement of the carriage 10, it is resiliently supported on counterbalance supports arranged one at each lateral margin of the carriage.

Such a support may comprise springs 17 and adjustable supporting blocks 18 which are adjustably mounted on the support 7 near the lateral margins of the carriage 10. Each block 18 is guided for vertical and horizontal adjustment relative to the support in a suitable way 19 and is secured in fixed operating position on the turret by suitable bolts 20. The blocks 18 engage the carriage with lateral clearance and thereby limit its movement longitudinally of the guides 14 and 15. A lug or bracket 21 is provided on the support 7 beneath each block 18. Each bracket 21 carries an adjusting screw 22 by which its block 18 can be positioned accurately and buttressed vertically to prevent it from creeping downwardly out of position in event of any loosening of the bolts 20.

A suitable lug 24 is fixedly secured on the carriage 10. A tension rod 25 is slidable vertically in a bore in the lug 24. The rod 25 extends through the counterbalance spring 17 and thus retains it properly in position between the lug 24 and a washer 26 carried on the lower end of the rod 25. An adjusting nut 27 is mounted on the rod 25 at the upper face of the lug 24 for adjusting the preloading of the spring 17 by the rod 25. The washer 26 rests on the top of the block 18 so as to transfer the spring reaction from the block 18 to the lug 24. With this arrangement, the carriage 10 can float a limited amount universally along the face 11 of the turret while counterbalanced and held against the face 11.

Since the carriage 10 is so arranged for floating movement, means must be provided for accurately positioning it and holding it fixedly in position. For this purpose, the carriage 10 is provided with integral sockets 28 which open forwardly toward the spindle machines and whose axes are horizontal and parallel to the machine spindle axis. Suitable bearing sleeves 29 are provided in the sockets. The guide pins 6, mounted on the carriage 2, are arranged to enter the sleeves 29 of the sockets 28 and fit them snugly so as to shift and hold the chuck carriage 10 in accurate aligned position relative to the pins and spindle machine carriage, and therefore relative to the axis of the spindle 4.

Thus, as each chuck is presented to the machine spindle 4, and the spindle carriage 2 advances, the pins 6 enter the sockets 28 and shift the floating carriage 10 along the plane of the upright face 11 of the support 7 into the proper machining position.

As mentioned, the chuck 8 is mounted on its carriage 10 for rocking about a transverse axis extending transversely of and intersecting at 90°, its throat axis. In the form illustrated, this rocking transverse axis is disposed horizontally in a plane normal to the axis of the associated spindle and is disposed between the forward and rearward faces of the chuck.

The chuck 8 comprises a body 30 which is provided with horizontal coaxial trunnions 31 and 32 at its opposite sides, respectively. The trunnions are rotatably supported in suitable roller bearings 33 and 34, respectively, on the carriage 10. Mounted within the body 30 are gripping jaws 35 which are arranged to be advanced concurrently toward the axis of the chuck throat and receded therefrom concurrently. A piston wedge ring 36 is provided for operating the jaws concurrently. This ring has a large diameter portion 37 and a reduced diameter portion 38, these portions being slidable in corresponding bores 39 and 40, respectively, in the body 30. Suitable O-ring seals 41 are provided on the portions 37 and 38 of the ring so as to form a seal between its end margins and the walls of the bores 39 and 40, so that the ring acts as a hydraulic piston. The ring 36 is provided at its inner periphery with a wedge surface 42 which engages complementary wedge surfaces 43 on the jaws 35. These wedge surfaces are so arranged that advancing of the ring forwardly toward the machine spindle 4, advances the jaws to gripping position.

The jaws may be of the general type disclosed in United States patent of Reynold G. Anschutz, No. 2,982,557, issued May 2, 1961. As there disclosed, each jaw is held, at its ends, by suitable coil springs 46 against slide surfaces. The springs not only assist in maintaining the jaws in parallelism with their starting positions, but also act as return springs for returning them to retracted positions upon withdrawal or retraction of their closing wedge ring 36. The specific type of gripping jaws, however, is not a part of the present invention.

The jaws 35 preferably have gripping face elements 45 which are quickly detachable, as described in my copending application, Serial No. 147,645, filed October 25, 1961.

In order to supply pressure fluid to the bore 39, at the rear of the large diameter portion 37 of the wedge ring 36, a suitable duct 47 is provided in the trunnion 32, and is connected to a suitable fitting 48 through which pressure fluid under control of a remote valve is supplied.

To rotate the chuck to desired angular positions about the common axis of the trunnions 31 and 33, the trunnion 31 is provided with a driven gear 50 which is keyed thereto for rotation therewith. The gear 50 is driven by a gear segment 51, pivotally mounted by a pivot 52 on the side wall of the carriage 10. For rocking the gear segment 51 about its pivotal axis and thereby, through the segment 51 and gear 50, rocking the chuck body 30 about the axis of the trunnions, suitable power means are provided. The power means comprises a reversible piston and cylinder asesmblage 53, including a cylinder 54 and a piston 55 having a piston rod 56. The piston rod is pivotally connected, as indicated at 57, to the gear segment and the cylinder is pivotally connected, as indicated at 58, to a suitable lug on the carriage 10. Thus upon extension and retraction of the piston rod by fluid pressure in the reversible piston and cylinder assemblage, the chuck 8 is rocked in opposite directions to the desired positions for operation, selectively. Usually, it is rocked from its one operating position 180° to the other operating position and reversely rocked for return.

To assure that the axis of the chuck throat is horizontal and parallel with the axis of the spindle of the machine 1, the chuck body 30 is provided with suitable sockets 60 having frusto-conical walls with their larger bases disposed outwardly and their axes extending parallel to the axis of the trunnions 31 and 32.

Mounted in the carriage 10 are reciprocating latching pins 61. These pins are accurately mounted in sleeve bearings 62 so as to be coaxial with the sockets 60 when the chuck is precisely in proper rotated position about the axis of the trunnions 31 and 32. The pins 61 are provided with tapered lead ends 63 complementary to the frusto-conical walls of the sockets 60, so that, should the chuck be slightly out of proper rotated position, upon movement of the pins, the pins, by cooperation of their tapered ends with the frusto-conical walls of the sockets, can rotate the chuck slightly to bring it precisely to the proper rotated position about the axis of the trunnions.

For operating the pins to advanced latching position or retracted free position, suitable reversible hydraulic piston and cylinder assemblages 64 are provided. Each assemblage comprises a cylinder 65 and a piston 66 reciprocable therein, and having a piston rod 67. The rod 67 is fixedly connected to its associated pin 61. Pressure fluid is supplied to opposite ends of the cylinder assemblages 64 by suitable hoses 68 and 69, respectively, through a suitable presettable reversing control valve 70. As will later be explained, pressure fluid is supplied to the control valve 70 from a supply valve, later to be described, and which may be shut off while the valve 70 is being preset. The valve 70, therefore, is a presettable means which, while the pressure fluid is shut off, is preset, as will now be described, so that when the pressure is again admitted, it will cause rotation of the chuck by the piston and cylinder assemblage 53 through 180° from its previous operating position.

The valve 70 is of a conventional type in which the porting is set by rotation of a stem 71. The stem 71 is driven by a cam wheel 72 having shoulders 72a disposed radially of the stem 71. In order to preset the presettable means or valve 70, a rocker arm 73 is pivotally mounted on the carriage 10 by a pivot 74. The arm carries at its lower end a cam roller 75 which, when the lever 73 is swung clockwise about its axis, or towards the support 7, engages one of the shoulders 72a of the cam wheel 72 and rotates the wheel 90°. When, on the other hand, the lever 73 returns, it is inoperative with respect to the next successive shoulder on the star wheel.

For this purpose, it comprises an upper portion 73a and a lower portion 73b, these portions being connected together by a pivot 76. A stop pin 77 is provided on the upper portion 73a to arrest rotation of portion 73b in a counterclockwise direction about the pivot 76, but to permit it to rock in a clockwise direction thereabout. A plate 78 is connected by the pivot 74 so as to bear against the portion 73a. A spring pressed pin 79 is mounted in a socket 80 carried by the carriage 10 and is suitably urged by a spring 81 against the plate 78. The pin 79, therefore, yieldably returns the arm 73 counterclockwise about the pivot 74. As the arm returns, the portion 73b swings free of the pin 77 and passes the aligned shoulder of the cam wheel 72 without rotating the wheel.

In order to operate the arm 73, the carriage 10 is provided with guide plates 82 having an opening 83 therein, the openings facing away from the support 7 and opening toward the spindle machine 1. Mounted on the carriage of the spindle machine is a suitable trip finger 84 arranged so that upon advancement of the spindle toward and into machining position it passes through the opening 83 and strikes the arm and swings the arm 73 clockwise about the pivot 74, thus rotating the cam wheel 72 through an angle of 90°. Upon retraction of the spindle machine carriage, the finger 84 is released from the lever 73, whereupon, due to the spring return pin 79, the lever 73 is swung counterclockwise, its portions 73a and 73b buckling about the pivot 76 so as to pass the cam wheel shoulder which had been moved to the upright position on the advance stroke. In this way, the cam wheel sets the presettable valve 70 during each machining operation to a position such that, when pressure is admitted to the presettable valve 70, it will deliver pressure fluid to the piston and cylinder assemblage 53 so as to rock the chuck body 30 through an angle of 180° from the position in which it was at the beginning of the operation.

As mentioned, it is desirable that the chuck body 30 be prevented from deflection transversely of the common axis of the trunnions 31 and 32 during the machining operation. For this purpose, and to prevent any rocking of the body about the common axis of the trunnions, preloading means are provided. The preloading means, indicated generally at 90, comprise a preloading member 91 which, in the form illustrated, is a sleeve slidably mounted in a bearing 92 in the chuck carriage 10 so as to move in coaxial relation with the chuck throat when the chuck is precisely in its operating position with respect to a machine spindle.

The sleeve 91 is so arranged that its end engages the chuck body 30 outwardly from the axis of the chuck throat and in surrounding relation to the axis, so that the force applied by the sleeve is evenly distributed and operates to resist tilting of the body about the axis of the trunnions 31 and 32 and deflection toward the turret. The forward end face of the sleeve, therefore, defines a plane normal to the axis of the spindle of the machine when the chuck is in operating position at a station. The faces of the chuck 8 are flat and parallel to each other and define planes normal to the axis of the chuck throat. Thus when the sleeve is pressed firmly against the chuck, any slightly discrepancy in the rocked position of the axis of the throat about the axis of the trunnions 31 and 32 is eliminated and the axis of the throat is brought to a true horizontal position coincident with the axis of the spindle.

Since the carriage 10 is floatingly mounted on the support 7, clearance is provided between the sleeve 91 and the support 7. For this purpose, the support has a passage 93 of slightly larger diameter than the sleeve, depending upon the distance or amount of floating movement permitted for the carriage 10. Thus the sleeve at all times moves in precise position relative to the chuck carriage. It is necessary, however, that the sleeve be applied with considerable pressure to preload the chuck carirage properly. For forcing the sleeve 91 firmly against the face of the chuck exposed thereto, a suitable reversible piston and cylinder assemblage 95 is mounted in the support 7. This assemblage includes a piston 96 operating in a cylinder 97 and having a piston rod 98. The rod 98 has a reduced end portion 99. The sleeve 91 is provided with a transverse web 100 which is provided with an axial passage 101 which receives the reduced portion of the piston rod 99. The passage 101 is slightly greater in diameter than the reduced portion 99 of the piston rod and the rod is connected to the web so as to float a slight amount relative to the sleeve. Thus preventing any binding between the web and the rod due to slight misalignment of the two due to the shifting of the carriage 10 transversely of the piston axis.

Suitable ducts 102 and 103 in the support 7 are connected to opposite ends of the cylinder 97 for supplying pressure fluid driving the piston to extended position to apply the sleeve 91 to the chuck and to retracted position, respectively. These ducts are controlled by valves, as will later be described.

In order to supply coolant to the tools of the spindle machines, the sleeve 91 is provided with a coolant duct 107 connected by a hose 108 to a source of coolant under pressure and controlled by a suitable valve 109.

The reduced portion of the piston rod is provided with a transverse duct 113 and a longitudinal duct 114 which leads to a nozzle 115 on the end of the piston rod. The nozzle 115 has spray ports 116 arranged to spray the coolant outwardly and forwardly, thus to spray it onto the portion of the sleeve being machined. Suitable fins 118 may be provided on the piston rod 98 for directing the coolant discharged from the nozzle and assure alignment of the coupling sleeve or workpiece properly in the jaws.

Referring first to opening and closing of the chuck, a valve 119 is operated by a rockable foot treadle 120, located at any convenient position adjacent the work site. The valve 119 is normally open and connects the fitting 48 of the clutch to a source of fluid pressure so as to apply pressure to the ring 36 to advance it for closing the jaws 35. Upon closure, the valve 119 vents the bore 40 to the sump, whereupon the springs 46 return the jaws 36 and ring 36 to starting position.

Referring next to the preload and latching mechanisms, assuming the jaws are closed, a limit switch 121 is arranged to be operated by the spindle carriage as it starts forward from its retracted position toward machining position. The limit switch 121 controls a solenoid operated valve 122 in a manner such that, as the machine starts its advance, the valve 122 operates to admit pressure to the head end of the preloading assemblage 95 to advance the sleeve 91 and preload the chuck and concurrently vent the rod end of the assemblage 95. Concurrently, it admits pressure fluid to the head end of the latch pin assemblages 64 through the hoses 68 and vents the rod ends through the hose 69. This seats the latch pins firmly. Since the head ends of the assemblages 64 and 95 are connected in parallel, they build up pressure concurrently.

This same setting of the valve 122 discontinues the supply of pressure to the presettable valve 70.

Upon advance of the carriage 2 to fully advanced position, the finger 84 presets the valve 70 so that, upon pressure subsequently being supplied to the valve 70, it will admit pressure to the proper end of the assemblage 53 for rolling the chuck through 180°. As the carriage 2 returns to its retracted position, the limit switch 121 returns to its original position as also does the valve 122.

This admits pressure fluid to the rod end of the latch assemblages 64 through the hoses 69 and to the rod end of the preload assemblage 95 through the duct 103 and vents the head ends of the assemblages to retract the preload sleeve 91 and the pins 61. The rod end of the latch assemblages 64 and the preload assemblage 95 are connected in series with the valve 70. Consequently, as pressure fluid is admitted to the rod ends of these assemblages, it also is admitted to the valve 70 which has been preset by the finger 84 to deliver pressure fluid to the proper end of the roll-over assemblage 53 and to vent the opposite end. Thus the preload assemblage is retracted to withdraw the preload sleeve. The assemblages 64 are operated to retract the latching pins 61 and the assemblage 53 is operated to rotate the chuck through an angle of 180° from the position in which it was at the beginning of the operation, so as to present the other end of the workpiece for machining.

Upon the next advance of the machine carriage, the sequence is repeated.

*Operation*

Thus, in operation, assuming the machine is retracted and the chuck 8 is gripping a finished workpiece, the coolant pump, not shown, is started and supplies coolant through a suitable manually operable stop valve 109 to the house 108. The foot treadle 120 is operated to close the valve 119. Thereupon, the springs 46 open the chuck jaws 35 releasing the workpiece therein. Next, a new workpiece or sleeve is placed in the chuck 8 and the treadle 120 is operated to permit the valve 109 to open and thereby direct fluid pressure to the rear end of the piston and wedge ring 36 for closing the jaws 35.

The spindle machine starts to advance and operates the limit switch 121 to cause the solenoid valve 122 to admit pressure fluid to the head ends of the latch assemblages 64 and the preload assemblages 95, thus latching and preloading the chucks 8. The spindle advances and performs its operation on the chucked sleeve, and then retracts. When it is retracted, the limit switch 121 causes the valve 122 to admit pressure fluid to the rod ends of the latch assemblage 64 and preload assemblages 95, thus releasing the chucks for roll-over, and concurrently delivering pressure to the present valve 70 so that it delivers pressure to the proper end of the roll-over assemblage 53 for rolling over the chuck. Hence, upon the next advance of the machine carriage 2, the sequence is repeated.

Having thus described my invention, I claim:

1. A chuck device comprising a support, a chuck having front and rear operating faces, respectively, to be presented toward a work station, selectively, supporting means supporting the chuck on the support for rotation to different selected positions about a rotational axis lying in a plane intermediate its faces and normal to the axis of the chuck throat, a preload member, movable means supporting the preload member for movement generally parallel to the axis of the throat when the chuck is in operating rotated positions to an advance position wherein the preload member bears against whichever face of the chuck is disposed away from the station and thereby constrains the chuck so that, in each rotated position, its throat axis is precisely in proper predetermined position, and power means to move the preload member to, and retract it from, said advance position.

2. A chuck device in accordance with claim 1 wherein a power means hold the preload member in yieldable engagement with the chuck face presented toward the member.

3. A chuck device according to claim 1 wherein the chuck includes a rigid body with gripping jaws therein, said preload member is a sleeve substantially coaxial with the chuck throat when the chuck throat axis is in said precise predetermined position, and the sleeve engages the chuck outwardly from the axis of the throat.

4. A chuck device according to claim 3 wherein said sleeve has a duct for coolant fluid therein, a nozzle is carried in the sleeve and is connected to said duct and is arranged to discharge forwardly toward the chuck jaws and outwardly from the sleeve, whereby coolant can be supplied to the inside of an open end article held in the chuck jaws.

5. A chuck device according to claim 1, wherein the supporting means comprises a carriage which is slidably mounted on a support for movement in a plane generally normal to the position in which the chuck throat axis extends when the chuck is in precise operating position, the preload member is supported by the carriage for sliding in a fixed path normal to said plane and engages the body of the chuck to apply force thereto in balanced relation about the throat axis, power means are carried on the support and are connected to the preload member for relative movement parallel to said plane of movement of the carriage so that the member has limited floating movement relative to the power means in a direction parallel to said plane.

6. A chuck device according to claim 5, wherein the preload member is a sleeve coaxial with the throat axis of the chuck when the chuck is in operating position, the preload power means is a piston and cylinder assemblage connected to the support and includes a piston rod, and the piston rod is generally coaxial with the sleeve and is connected thereto for limited relative movement radially of the sleeve.

7. A chuck device according to claim 6, wherein the sleeve has a web with a central passage therethrough in which the piston rod is accommodated with radial clearance, a seal is provided between the rod and wall of the web passage adjacent the ends of the web passage, thus providing between the piston rod and wall of the sleeve passage a peripheral coolant passage, the sleeve has duct means therein to supply coolant liquid into the peripheral coolant passage, and said piston rod has a duct communicating with the peripheral passage for conducting coolant liquid therefrom, a nozzle is carried by the piston rod and connected to said duct and arranged to discharge the coolant fluid in a direction outwardly and forwardly toward the chuck relative to the sleeve.

8. A chuck device comprising a chuck body, gripping jaws therein, a support, a carriage mounted on the support for movement parallel to a plane normal to the throat axis of the chuck when the chuck is in operating position, resilient counterbalance means connecting the carriage and support for yieldably counterbalancing the weight of the carriage, a machine support for supporting a machine for movement toward and away from the chuck parallel to the throat axis when the chuck is in operating position, positioning means on the carriage, complementary positioning means on the machine support and movable by the machine support into engagement with those on the carriage upon movement of the machine support toward the carriage, and operable, upon said engagement, to move the carriage parallel to said plane into a preselected precise position relative to the machine support, and to hold the carriage in said precise position.

9. A roll over chuck including a support, a chuck body having front and rear faces with gripping jaws therebetween defining a throat, means supporting the body for rotation end over end about a transverse axis between the faces and normal to, and intersecting, the throat axis, power operated means to rotate the body about the transverse axis, and means to latch the body in rotated positions, selectively.

10. A roll over chuck according to claim 9 wherein presettable control means are provided through which power is supplied to the power operated means from a source, additional control means are operable to admit and stop the supply of power, selectively, to the presettable control means, means are provided which are operable to preset the presettable control means while the additional control means is operative to stop the supply of power to the presettable control means.

11. A roll over chuck according to claim 10 wherein the presettable control means include a rotatable member having a plurality of shoulders spaced from its rotational axis, a control member movable by the rotatable member to different control positions upon rotation of the rotatable member to different positions, an element movable toward and away from the chuck body and arranged when moved toward the body to engage one of said shoulders for presetting a settable control means.

12. A roll over chuck according to claim 9 wherein said power means comprise a gear rotatable in fixed relation with the chuck body and coaxial with said transverse axis, a gear segment drivingly connected thereto, a piston and cylinder assemblage for rocking the segment about its rotational axis.

13. A chuck device comprising a support, a chuck body, movable jaws mounted therein and defining a throat, coaxial trunnions on the body and disposed with their common axis in a plane intersecting the throat axis, and supporting the body for rotation about their common axis to different preselected positions, said body having a bore coaxial with the throat, a piston ring in the body coaxial with the bore and slidable therein axially of the throat, means connecting the ring to the jaws for operating the jaws by the ring upon sliding the ring in one direction, one of said trunnions having a duct leading to said bore at one side of the ring for admitting fluid pressure to cause the ring to slide in said one direction, and means for connecting said duct to a controlled source of fluid pressure.

References Cited in the file of this patent

UNITED STATES PATENTS

| | | |
|---|---|---|
| 2,643,132 | Hunziker | June 23, 1953 |
| 2,732,216 | Sloan | Jan. 24, 1956 |
| 2,768,830 | Janson | Oct. 30, 1956 |
| 2,972,487 | Blackburn | Feb. 21, 1961 |